No. 764,910. PATENTED JULY 12, 1904.
F. A. BROWNELL.
CAMERA.
APPLICATION FILED APR. 21, 1903.
NO MODEL. 2 SHEETS—SHEET 1.
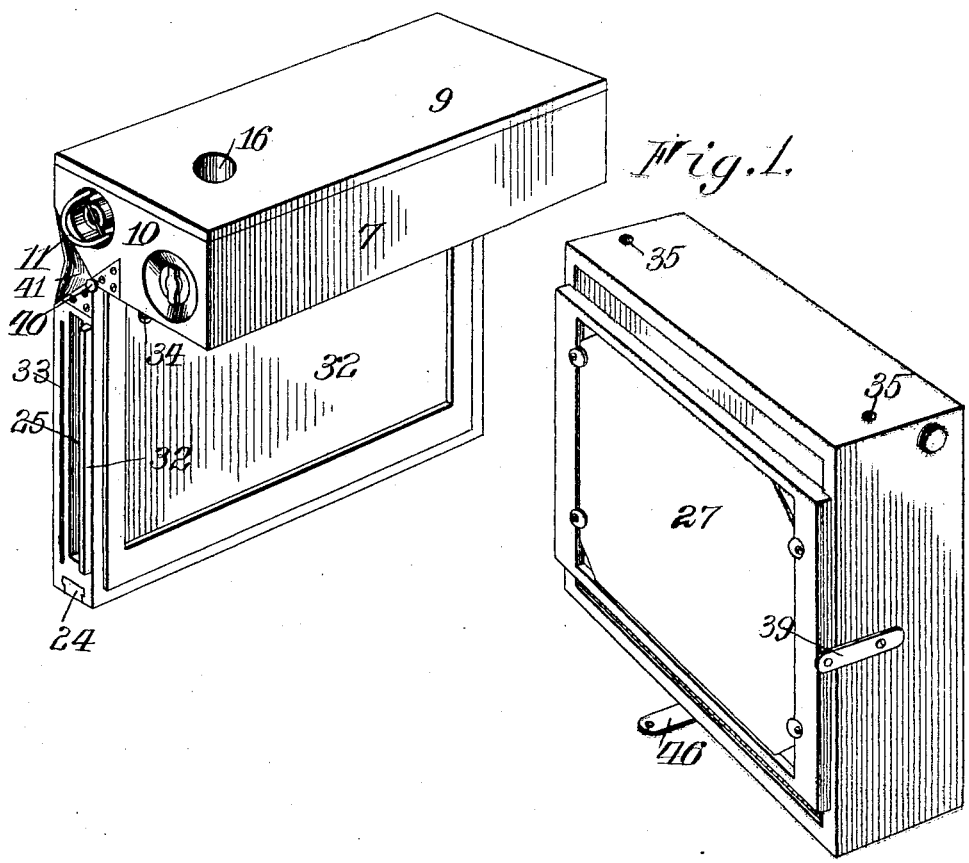
Fig.1.
Fig.5.
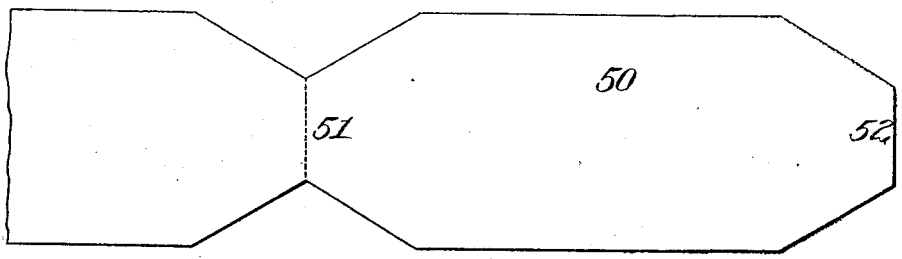
Witnesses. Inventor.
Walter B. Payne. Frank A. Brownell
G. Willard Rich. by Frederick F. Church
Attorney.

No. 764,910. PATENTED JULY 12, 1904.
F. A. BROWNELL.
CAMERA.
APPLICATION FILED APR. 21, 1903.
NO MODEL. 2 SHEETS—SHEET 2.
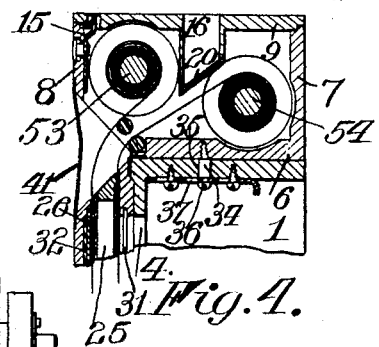
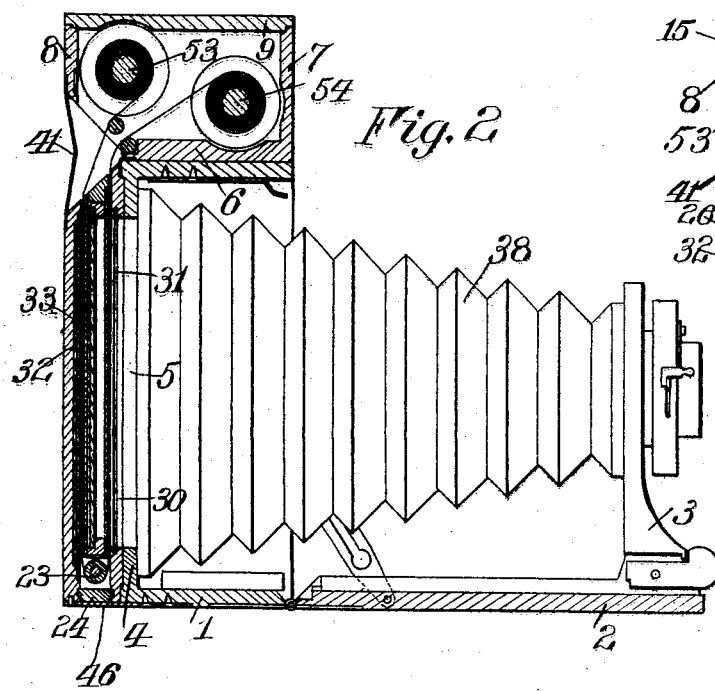
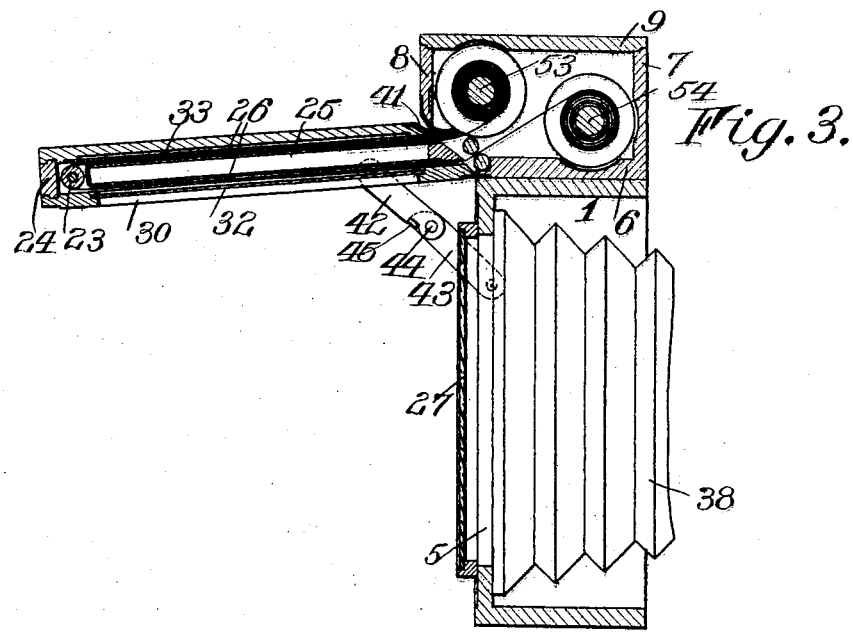
Witnesses.
Walter B Payne
G Willard Rich
Inventor.
Frank A Brownell
by Frederick F Church
his Attorney No. 764,910.

Patented July 12, 1904.

UNITED STATES PATENT OFFICE.

FRANK A. BROWNELL, OF ROCHESTER, NEW YORK, ASSIGNOR TO THE EASTMAN KODAK COMPANY, OF ROCHESTER, NEW YORK, A CORPORATION OF NEW YORK.

CAMERA.

SPECIFICATION forming part of Letters Patent No. 764,910, dated July 12, 1904.

Application filed April 21, 1903. Serial No. 153,593. (No model.)

*To all whom it may concern:*

Be it known that I, FRANK A. BROWNELL, of Rochester, in the county of Monroe and State of New York, have invented certain new and useful Improvements in Cameras; and I do hereby declare the following to be a full, clear, and exact description of the same, reference being had to the accompanying drawings, forming a part of this specification, and to the reference-numerals marked thereon.

My present invention relates to roll-holder cameras, in which an exposure is made upon a strip of sensitized material, such as film, extending in the focal plane of the lens and attached at its ends to rollers or spools; and my invention has for its object to provide a camera having a roll-holder and a support for the sensitized film, the parts of which are so arranged that the latter may be moved out of the focal plane of the lens to allow the operator to focus the latter to produce a clear-cut and well-defined picture on the focusing-screen.

To these and other ends the invention consists in certain improvements and combinations of parts, all as will be hereinafter more fully described, the novel features being pointed out in the claims at the end of the specification.

In the drawings, Figure 1 is a perspective view of a camera constructed in accordance with my invention, showing the parts thereof detached. Fig. 2 is a side elevation, partly in section, showing the parts in their normal position. Fig. 3 is a similar view showing the film-support in the open position. Fig. 4 is a sectional view showing the sight-aperture. Fig. 5 is a plan view of the threading sheet or web.

Similar reference-numerals in the several figures indicate similar parts.

I have shown my invention as applied to a folding camera embodying the body or box 1, provided with a drop front 2, as shown in Fig. 2, on which is supported the extensible frame 3, carrying the lens-mounting, and to which is also attached the forward end of the bellows 38, the opposite or rear end of which is attached to the bed 4. The latter is provided with the usual central aperture 5 and, if desired, the camera may be provided with the usual or any preferred construction of plate-holding devices, an illustration of which has in the present instance been omitted, as the present invention comprehends the application of a suitable roll-holder the parts of which are so arranged that it may be used in conjunction with such plate-holding devices and also permitting the lens to be focused in the usual manner, as will be further explained.

Arranged at one side of the camera box or body is a casing provided with the bottom 6, front and rear walls 7 and 8, respectively, a top 9, and the ends 10, which latter are provided with suitable centering devices for the holding and winding spools. At one end is also provided a suitable winding-key 11 for operating the receiving-spool, as shown in Fig. 1. Access may be had to the chamber in which the spools are contained by removing or opening the cover 9, which is hinged at one edge and secured at the opposite side by means of spring-catches 15, engaging suitable catch-plates in the cover, as shown in Fig. 4. The cover is also provided with an aperture 16, beneath which extends a tube or well provided at its lower end with a covering of colored glass or similar transparent material 20, arranged to permit the operator to inspect markings or indications provided at intervals upon a strip of film or the usual opaque covering provided upon the latter. At one side of the casing is an extension 22, adapted to project over the rear end of the box or body and in the focal plane of the camera-lens. This extension is also hollow, virtually forming a portion of the chamber containing the film-spools, and arranged therein is a film-support over which the film is passed. This support is formed by a roller 23, located at the end of the extension, as shown in Figs. 2 and 3, and to which access may be had through a slide or door 24. In order to utilize the space in line with the roller and between the forward and rear sides of the film and provided in the casing is a pocket 25, formed by parallel front and rear walls 26, forming a convenient receptacle in which the usual ground-glass focusing-screen 27 may be arranged when not in use, as shown in Fig. 2. In front of the film-support the casing is provided with an aperture 30, adapted to register with the aperture 5 in the camera-bed 4, whereby the sensitized film may be acted upon by the rays of light admitted to the interior of the camera. The edges of this aperture are slotted, as at 31, for the reception of a laterally-movable closure or slide 32, and as the latter is withdrawn when the film-support is in the operative or picture-taking position I provide a suitable holder or pocket arranged in the rear wall of the casing and indicated by 33, in which the slide may be held when not in use.

The casing containing the holding and receiving spool may be formed integrally with the camera-body 1; but as it may also be made removable I have illustrated the parts as capable of detachment. Suitable connections between the casing and camera-body are employed to secure the roll-holder and camera-body together, and in the present instance these consist of posts or studs 34, arranged at opposite ends of the bottom 6 of the casing and adapted to project through apertures 35 in the top of the camera-body. The lower end of the posts are provided with reduced portions or shoulders 36, and engaging therewith are catches or latch members 37, arranged within the camera-body, as shown in Fig. 4.

By making the casing removable the entire device may be detached from the camera-body to move the film-support out of the focal plane, permitting the ground-glass screen 27 to be placed in focusing position on the bed 4, where it is retained by small spring-catches 37. After this operation the screen may be removed and the roll-holder applied in position. A preferable construction, however, is the one shown, in which the extension 22 is movably attached to the casing, as by a hinge 40, as shown in Fig. 1, the proximate portions of the casing and extension being chamfered or cut away on diverging lines, as shown in Figs. 2 and 4, the joint between the parts being made light-tight by a flexible connection of leather or similar opaque material 41, which permits their relative movement, as shown in Fig. 3. In order to hold the film-support in the open position shown in said figure, I provide between the extension of the casing and the camera-body arms 42 and 43, jointed at 44 and provided with a stop 45 to limit their opening movement and hold the arms in alinement, as will be understood. At the bottom of the camera-body is provided a small spring finger or catch 46, adapted to engage the lower end of the extension 22 to retain it in the normal position.

In Fig. 5 I have illustrated the threading strip or web 50 corresponding to a portion of the sensitized film which is arranged around the guide or roller 23, with its ends extending into the spool-chamber. This strip has its ends 51 and 52 formed narrower than the body, the former being adapted to be connected to the winding-spool 53, while the latter is attached to the free end of the film or the covering therefor, which is mounted on the holding-spool 54. By this arrangement it will be seen that the operator is enabled to thread or lead the film around the support in the extension of the casing without difficulty. To this end the threading-strip may be applied to or formed directly on the rear end of the film, as shown in Fig. 5, the line of connection being provided with perforations whereby said strip may be easily detached before removing the roll of exposed film from the camera. The threading-strip being drawn around the support at the end of each strip of film always leaves the device adapted for the reception of an unexposed roll, as will be understood; but if said strip is for any reason omitted the operator may open the door or slide 24 and readily guide the advancing end of another strip around the roller 23 and between the adjacent walls of the film-support and casing.

I claim as my invention—

1. The combination with a camera, of a roll-holder comprising a casing arranged at one side of the camera, containing receiving and winding spools for sensitized material and a support for the latter located in rear of said spools and extending over the camera.

2. The combination with a camera, of a roll-holder comprising a casing arranged at one side of the camera, containing receiving and winding spools for sensitized material and a support for the latter located in rear of said spools and extending over the camera and movable into and out of alinement therewith.

3. The combination with a camera embodying a chamber arranged at one side thereof and containing holding and winding spools for sensitized material, of an extension on said chamber arranged in rear of the spools and adjustable into and out of alinement with the rear of the camera and a support in said extension around which the sensitized material is passed.

4. The combination with a camera, of a casing mounted on one side thereof forming an exterior chamber extending over one side of the camera and having an extension at its rear side projecting over the rear of the camera, film holding and winding spools mounted in the chamber and a support arranged in the extension around which the film is passed.

5. The combination with a camera and a roll-holder comprising a casing arranged at one side of the camera, containing film holding and winding spools, of a support for the film extending over the rear of the camera and means arranged between the roll-holder casing and the side of the camera for detachably connecting them.

6. The combination with a camera, a roll-holder comprising a casing arranged at one side thereof and film holding and winding spools mounted in the casing, of an extension on the latter arranged in rear of the camera provided with an open side, a laterally-movable slide for closing it and a film-support arranged in said extension.

7. The combination with a camera, of a roll-holder embodying a casing adapted to be applied to the exterior of the camera and containing film holding and receiving spools and a film-support movably connected to the casing and adapted to be moved into and out of engagement with the rear side of the camera.

8. The combination with a camera comprising a body having an open rear side, of a roll-holder embodying a casing adapted to be removably applied to the camera-body at one side thereof, and extending over the open rear side of the latter, said extension having an opening at its forward side, a slide for closing the opening movable laterally of the casing and film holding and winding spools arranged in the casing and a film-support arranged in said extension.

9. A roll-holder for cameras embodying a casing adapted to be removably applied to a camera and containing film holding and receiving spools, a support around which the film is passed and a pocket formed therein between the overlapping portions of the film.

10. A roll-holder for cameras embodying a casing adapted to be applied to a camera and containing film holding and winding spools, a support around which the film is passed, a casing inclosing said support open at one side, a slide for closing the latter and a pocket provided in the casing above the support.

11. A roll-holder for cameras comprising a casing having an extension at one side provided with an open front wall, a closure therefor and a rear wall having a pocket adapted to receive said closure, film holding and winding spools arranged in the casing and a film-support located in said extension.

12. A roll-holder attachment for cameras embodying a casing adapted to be applied to a camera-body at one side and containing film holding and winding spools and an extension of the casing adapted to extend over the end of a camera-body having a guide-roll therein over which the film is passed and a pocket in the extension arranged between the forward and rear sides of the film.

13. A roll-holder attachment for cameras embodying a casing adapted to be applied to one side of a camera-body and containing film holding and winding spools and an extension of the casing adapted to extend over the end of a camera-body having a guide-roll therein over which the film is passed and a door in the casing arranged in proximity to said roll.

14. In a roll-holder for cameras, the combination with a film-support, of a casing inclosing it and extending forwardly thereof to form a chamber at one end of the support and film holding and winding spools arranged in the chamber.

15. A roll-holder attachment for cameras consisting of a film-support, a casing inclosing it forming a chamber at one side thereof, film holding and winding spools arranged in the chamber and a threading-strip passed around the support having its ends extending into the chamber.

16. In a roll-holder camera, the combination with a casing forming a chamber adapted to contain film holding and receiving spools, of an extension hinged to the casing containing a film-support and a flexible light-excluding covering extending over the joint between the casing and extension.

17. In a roll-holder camera, the combination with a casing forming a chamber adapted to contain film holding and receiving spools, of an extension projecting at the side of the casing and hinged thereto containing a film-port, said casing and extension having cut-out portions to permit their relative movement, and a flexible light-excluding covering inclosing the joint between said parts.

18. A roll-holder for cameras embodying a casing containing spool-centering devices, of a casing hinged to the main casing and forming an extension thereof having an aperture at one side and a removable closure therefor, and a film-support at the end of said extension around which the film is adapted to be passed.

FRANK A. BROWNELL.

Witnesses:
G. WILLARD RICH,
ELIZABETH J. PERRY.